UNITED STATES PATENT OFFICE.

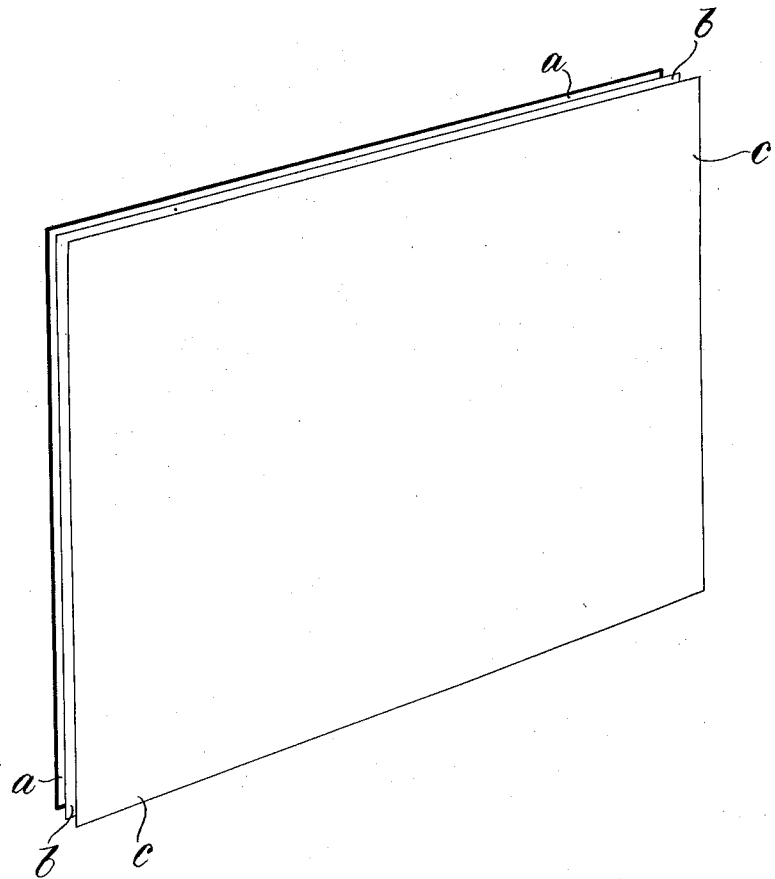

FRANK HEALE, OF PUTNEY, AND GEORGE WALLACE BRYANT, OF SOUTHSEA, ENGLAND.

SCREEN FOR CINEMATOGRAPH-PICTURES AND THE LIKE.

1,349,064.   Specification of Letters Patent.   Patented Aug. 10, 1920.

Application filed January 30, 1919. Serial No. 274,140.

*To all whom it may concern:*

Be it known that we, FRANK HEALE and GEORGE WALLACE BRYANT, subjects of the King of Great Britain and Ireland, residing, respectively, at Putney, in the county of London, and Southsea, in the county of Hampshire, England, have invented certain new and useful Improvements in Screens for Cinematograph-Pictures and the like, of which the following is a specification.

This invention relates to screens for cinematograph pictures and the like, and has for its object to produce a screen the image upon which appears to stand out with a stereoscopic and realistic effect instead of appearing flat as is the case with the ordinary screens used for cinematographic and other purposes.

The principle of the present invention consists in providing a screen having a plurality of surfaces suitable for the reception of the projected image, the surface at the back being a screen of ordinary description and the other surface or surfaces being formed of netting or the equivalent, arranged parallel to the back screen and all the surfaces being at short distances apart.

In the accompanying drawing wherein I have illustrated the preferred construction, three surfaces are shown for the reception of the projected image.

The surface *a* at the back or screen proper is composed of plaster or a fabric or the like, with the surface silvered or otherwise suitably prepared for the reception of the projected image. In front of, and parallel to this surface and at a short distance therefrom is another screen *b*, which we term the veiling screen composed of netting of suitable material or suitably prepared for the reception of the projected image.

In front of this last mentioned screen and at a short distance therefrom is another veiling screen *c* composed of netting similarly prepared.

It is to be observed that the netting for the veiling screen or screens may be manufactured from any suitable material having a surface upon which the image can be satisfactorily produced.

For instance a textile netting of comparatively fine mesh may be employed, say for instance 50 to the centimeter and the surface facing the projector may be coated with a material for giving the net the necessary silvered surface, care being taken when applying the coating that it only adheres to the threads and does not fill up the intervening spaces.

In some cases, where textile net is employed, it may be woven from threads already coated or having the necessary properties.

In some cases the back of the veiling net or nets turned toward the back screen may be black or blackened. For instance a textile net may be employed having black threads and these may be coated so as to present a silvered or other suitable surface toward the projector.

Any desired number of veiling nets may be employed and these may have similar or different sized meshes where more than one is employed.

Our experiments tend to prove that the best results are obtainable with two veiling nets, the inner one at a short distance, say one centimeter from the back screen and the front veiling net at a similar distance from the first mentioned veiling screen.

The stereoscopic effect appears to be attributable to the fact that the projected image is received on more than one surface and that the eye of the spectator can see the image at the back through the netting at the front, as well as a less intense image on each of the veiling net or nets.

The veiling screen or screens may be conveniently mounted and stretched on a framework or frameworks (not shown) carrying or fixed in front of the ordinary or back screen.

What we claim as our invention and desire to secure by Letters Patent of the United States of America is:—

1. A screen for cinematograph pictures and the like comprising a plurality of surfaces on which the picture is simultaneously projected from a single projector, and on which the picture is simultaneously viewed by the audience, said surfaces consisting of a back screen having its front surface suitably prepared for the reception of the projected image, and at least one veiling screen of a material having the qualities of fine mesh netting stretched completely over parallel to and fixed in close proximity to the back screen, for the purposes set forth.

2. A screen for cinematograph pictures and the like comprising a plurality of surfaces on which the picture is simultaneously projected from a single projector and on which the picture is simultaneously viewed by the audience, said surfaces consisting of a back screen having its front surface suitably prepared for the reception of the projecting image, and two front veiling screens each composed of material having the qualities of fine mesh netting stretched completely over and parallel to the back screen and each permanently fixed in close proximity to one another, and to the back screen, for the purposes described.

Dated this 7th of October, 1918.

In testimony whereof we affix our signatures in the presence of two witnesses.

FRANK HEALE.
GEORGE WALLACE BRYANT.

Witnesses to the signature of Frank Heale:
  A. E. VIDAL,
  A. BROWNE.

Witnesses to signature of G. W. Bryant:
  JAMES J. BISHOP,
  ALFRED F. HATTER.